Patented Nov. 14, 1922.

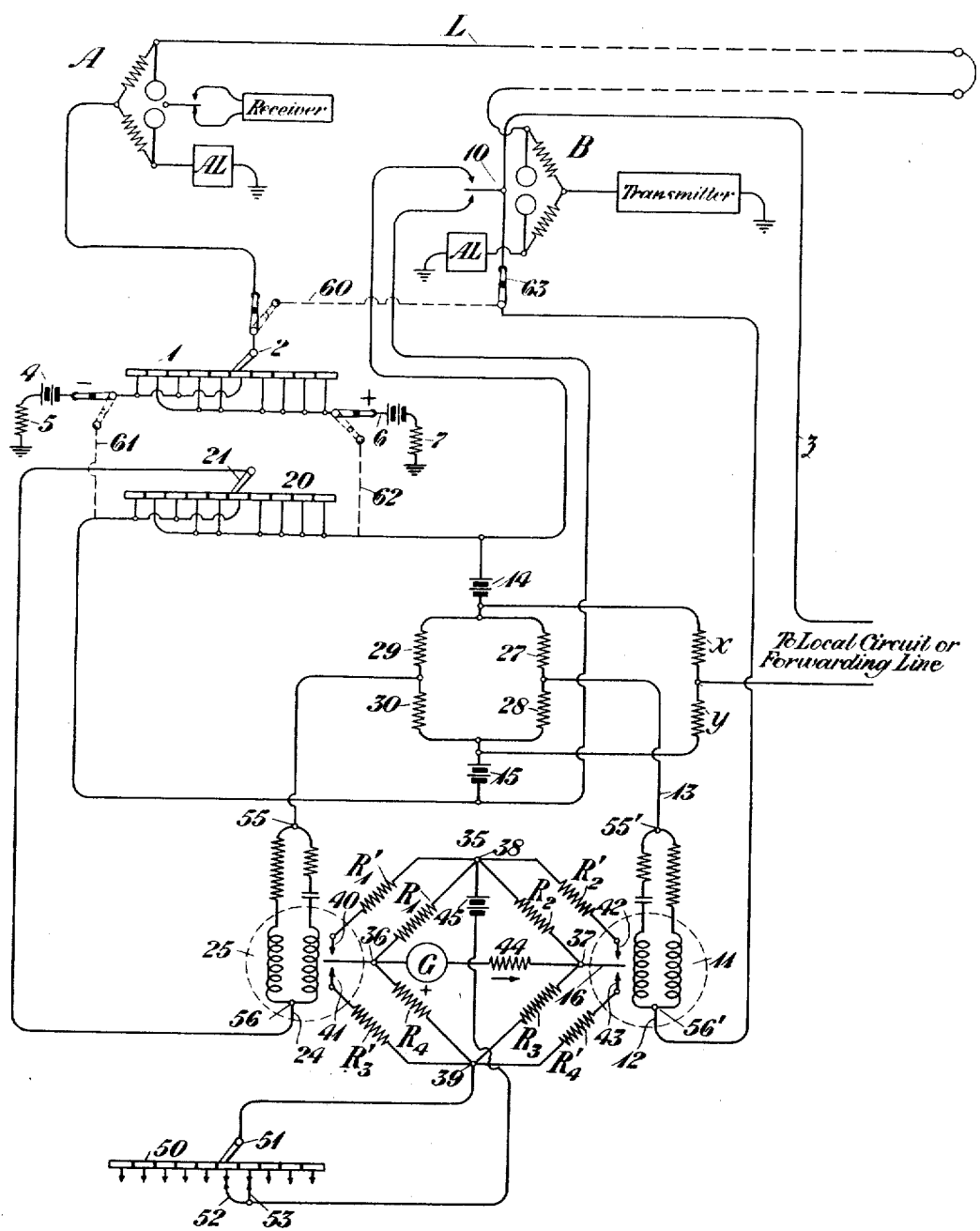

1,435,328

UNITED STATES PATENT OFFICE.

HARRY NYQUIST, OF WOODRIDGE, NEW JERSEY, ASSIGNOR TO AMERICAN TELEPHONE AND TELEGRAPH COMPANY, A CORPORATION OF NEW JERSEY.

DISTORTION-MEASURING APPARATUS.

Application filed January 23, 1920. Serial No. 353,416.

*To all whom it may concern:*

Be it known that I, HARRY NYQUIST, residing at Woodridge, in the county of Bergen and State of New Jersey, have invented certain Improvements in Distortion-Measuring Apparatus, of which the following is a specification.

This invention relates to the detection of distortion in signaling circuits and especially to the measurement of the distortion of telegraph signals incident to the transmission, including the measurement of the bias and lay of the apparatus. The distortion which it is especially desirable to measure is the amount by which a single dot, dash or space is lengthened or shortened by the effect of the transmission line upon the impulses.

Hitherto it has been customary for experts to judge the amount of distortion by ear, a good operator being able to detect the difference between what are designated as good and unsteady or biased signals. A somewhat more accurate detection of the distortion can be made by recording the received signal, as for instance on a Wheatstone recorder and comparing the dots, dashes and spaces with a like record of the undistorted signal. This method, however, is laborious and incapable of great accuracy because it frequently involves the comparison of two quantities large relative to the difference to be detected, and a small percentage of error in the determination of either quantity will appear as a great percentage of error in their difference. It is proposed by the present invention to measure directly the difference representing distortion and at the same time to determine the bias and lag present in the apparatus.

In the accompanying drawings, the single figure represents diagrammatically a system embodying the invention.

The transmission line indicated at L is here shown as an ordinary grounded telegraph line arranged for duplex operation in the usual manner, although it is to be understood that the invention is equally applicable to the measurement of distortion in metallic circuits.

For the purpose of explaining the measurement of the distortion over a line, station A may be regarded as the sending station and station B as the receiving station. In this case, these are illustrated for convenience as located at the same point, thus facilitating the synchronous operation of the apparatus used, but it is to be understood that the invention may equally well be applied to the measurement of the distortion in a line whose terminals are widely separated, in which case synchronous operation of apparatus at opposite ends of the lines may be secured in any one of a variety of well known ways.

For measuring purposes, a transmitter is used at the station A in the form of a distributor or commutator 1, here shown as developed into a straight line for the sake of clearness. This distributor is provided with a brush 2, which rotates relative to the segments of the distributor. The segments of the distributor are then connected in any desired way to represent a test signal. This is here shown as letter C of the Morse code, consisting of three dots spaced . . ., and for this purpose the 1st, 3rd and 6th segments of the distributor are shown as electrically united and connected to the negative pole of the battery 4 and thence to ground through the tap resistance 5. Similarly the 2nd, 4th, 5th, 7th, 8th, 9th and 10th segments are electrically united and connected to the positive pole of the battery at 6 and thence to ground through the tap resistance 7. If then the distributor is uniformly rotating impulses representing the letter $C_1$ and accurate in length and spacing will be repeatedly put upon the line. At the receiving station B, the usual polarized relay 10 of the receiving circuit is connected to operate a second polarized relay 11, one terminal 12 of the winding of relay 11 is connected to the tongue of the relay 10 and its circuit is completed through either positive or negative battery according to the contact of relay 10 upon which the tongue may be resting. Batteries for supplying positive and negative potential are shown at 14 and 15, respectively. In this way relay 11 will receive positive and negative impulses corresponding precisely to those received by the relay 10 and will operate its relay tongue 16 in accordance therewith.

In order to compare the impulses thus received over the line with corresponding undistorted impulses, a second distributor 20 is provided for generating an undistorted signal identical with that transmitted from the distributor 1.

The distributor 20 is in every respect like distributor 1 as to the spacing and connection of the segments and is driven in synchronism preferably by being connected with the same driving shaft. It is obvious that either the brushes or the segments may be rotated. The brush 21 of the distributor 20 is connected to one terminal 24 of the winding of a second relay 25, the circuit of the relay being completed through either positive or negative battery—15 or 14—depending upon whether the brush 21 is resting upon one of the segments connected to positive battery or one of the segments connected to negative battery. Batteries 14 and 15 are the same batteries that supply the relay 11, thus insuring that no difference in operation between relays 11 and 25 arises from a difference between the battery potentials operating the two. It is desirable that the current flowing from these batteries to the respective relays shall not pass through any impedance common to the two relay circuits. Therefore, separate tap resistances 27—28 and 29—30 are provided for the two relays. As indicated on the drawings, connections to a local recording circuit or forwarding line may be connected to the same batteries 14 and 15 by means of a separate pair of tap resistances X and Y and a lead Z running to the tongue of relay 10.

It will be clear from the description thus far given that the two relays 25 and 11 will operate respectively in accordance with an undistorted signal and a distorted signal as received over the line, and the operation of relay 11 takes into account the total distortion of the line including that due to the usual receiving relay 10.

A compound Wheatstone bridge 35 is used to register the difference between the distorted and the undistorted signals as represented in the relays 11 and 25. The bridge comprises the resistances $R_1$, $R_2$, $R_3$, $R_4$, arranged in the usual form for Wheatstone bridges. The tongue of the relay 25 is connected to one point 36 of the bridge and the tongue of relay 11 is connected to the opposite point 37. The remaining bridge points 38 and 39 are connected on each side to the opposite contacts of the relays at 40, 41 and 42 and 43, respectively, through resistances $R_1'$, $R_2'$, $R_3'$ and $R_4'$, which may be regarded as auxiliary bridge arms. A galvanometer G is connected between the points 36 and 37 of the bridge preferably in series with resistance 44 and the battery 45 is connected between the points 38 and 39 of the bridge and this circuit is provided with means for closing it during any desired part of the signal to be measured. For this purpose a third commutator 50 driven by the shaft of commutators 1 and 20, may be used. The brush 51 of this commutator is connected to one lead of the battery circuit and clips or other connecting devices 52—53 are connected to the other lead, these being of a kind which may be used to readily change the connections to the commutator leads. This enables the battery circuit to be closed only during such parts of the signal as it is desired for the moment to measure. When the battery circuit is open there will be no deflection of the galvanometer regardless of the operation of relays 11 and 25.

An explanation will first be given of the principle upon which the bridge of the form here shown operates. Suppose that a single dot is repeated at equal intervals so that the impulses of the undistorted dots traverse the windings of relay 25 and the impulses of the distorted dots received over the line traverse the windings of relay 11. Let the time when the respective relay tongues make and break contacts be represented by numbers indicating lapse of time figured from a predetermined zero or starting point and let the time when relay 25 leaves its spacing contact be $a$; the time when it strikes the marking contact be $b$; the time when it again leaves the marking contacts be $e$ and the time when it strikes the spacing contact be $f$. Let the corresponding time values for relay 11 be $c$, $d$, $g$, and $h$. If the signal impulses through the respective relay windings are not in unison, there will be a series of successive unbalances. These are of two kinds; single unbalances in which one tongue is in the air while the other makes contact, and double unbalances in which the tongues are on opposite contacts. The resistances may be readily so proportioned that the deflection of the galvanometer due to a double unbalance will be twice that due to a single one. The galvanometer will be designed to register deflections corresponding to either positive or negative current flow through its circuit. The deflection may be supposed to be positive when the current flow is in the direction of the arrow. Let the current corresponding to a double unbalance be $i$ and that corresponding to a single unbalance be $\frac{i}{2}$.

There are two possible cases: first when the tongue of relay 25 strikes the marking contact before the tongue of relay 11 leaves the spacing contact, in which case $b<c$, and second when the tongue of relay 25 strikes the marking contact after the tongue of relay 11 leaves the spacing contact, in which case $b>c$.

Taking the case when $b<c$, there is during the interval from $a$ to $b$, a current equal to $-\frac{i}{2}$, and the quantity of electricity passing through the galvanometer is $-\frac{i}{2}(b-a)$. During the interval from $b$ to $c$, the current is $-i$ and the quantity of electricity flowing is $-i(c-b)$. During the interval between $c$ and $d$, the current is $-\frac{i}{2}$ and the quantity of electricity flowing is $-\frac{i}{2}(d-c)$. Hence the total charge passing through the meter at the beginning of the dot is $$-\frac{i}{2}(b-a+2c-2b+d-c) = -i\left(\frac{d+c}{2} - \frac{b+a}{2}\right).$$

Considering the second case, that is when $b<c$; during the interval from $a$ to $c$, the current is $-\frac{i}{2}$ and the quantity of electricity is $-\frac{i}{2}(c-a)$; during the interval from $c$ to $b$, the current and the quantity of electricity are zero, since both tongues are in the air and the bridge is balanced. During the interval from $b$ to $d$, the current is $-\frac{i}{2}$ and the quantity of electricity is $-\frac{i}{2}(d-b)$, hence the total quantity in this case is $$-\frac{i}{2}(c-a+d-b) = -i\left(\frac{d+c}{2} - \frac{b+a}{2}\right).$$

Hence the formula for computing the quantity of electricity flowing at the beginning of the dot is the same in the two cases. At the termination of the dot the formula is $$+i\left(\frac{h+g}{2} - \frac{f+e}{2}\right)$$

The total charge of electricity passing through the galvanometer due to unbalance at the two ends of the dot is therefor $$i\left(\frac{h+g}{2} - \frac{f+e}{2} - \frac{d+c}{2} + \frac{b+a}{2}\right)$$
$$= i\left(\left[\frac{h+g}{2} - \frac{d+c}{2}\right] - \left[\frac{f+e}{2} - \frac{b+a}{2}\right]\right)$$

In polar telegraphy, the beginning of a marking is defined as the instant midway between the instant when the armature leaves the spacing contact and the instant when it reaches the marking contact. Likewise, the end of a marking is defined as the instant midway between the instant when the armature leaves the marking contact and the instant when it reaches the spacing contact. The beginning of a space is identical with the end of a marking and the end of a space is identical with the beginning of a marking. Hence $\frac{h+}{2}$ is the instant of the end of the dot received on relay 25, and $\frac{d+c}{2}$ is the beginning. It follows that the quantity in the first set of square brackets in the last equation above given is the duration of the dot received on coil 25. Similarly, the quantity in the second set is the duration of the dot received on the relay 11. Hence if one of these dots is undistorted, the total quantity of electricity passing through the meter is proportional to the distortion of the other dot. Therefore the operation of the bridge serves to compare the distorted signal with the undistorted signal and to register the difference. This difference may be read for a single dot or dash by using a ballistic galvanometer; or if the same signal be repeated at regular intervals an ordinary galvanometer will show a steady deflection which is proportional to the distortion.

In order that the bridge may operate accurately in accordance with the principle just outlined, it is essential that the relays 11 and 25 should respond promptly to the signals impressed and in such manner that no distortion is introduced by the relay test and the time of travel should be short. These results may be obtained by using two relay windings in parallel as shown in drawing, one of these windings being put in series with a high resistance and the other in series with a condenser and a low resistance.

To insure accurate measurements, it is also desirable that any bias in either of the relays 11 and 25 be eliminated and that the circuits as a whole be maintained in such condition that a zero reading of the galvanometer is had if two identical signals are introduced into the two relays. In order to detect any bias in the relays themselves, it will be sufficient to change the circuits between readings so as to reverse the connections of the relay contacts and at the same time to reverse the current through the relay windings. This may be done by simply reversing the connections to the binding posts represented at 55, 56, and 55′, 56′ and at the same time the connections to the binding posts at the contacts 40, 41 and the contacts 42, 43. If the relay is unbiased the effect of this change should be nil. If there is any bias, it will augment the distortion when the connections are in one position and subtract from it when the connections are in the other. It will be obvious that double throw reversing switches may be used for reversing these connections in actual practice if desired.

A further test of the accuracy of the setting of the apparatus may be made before beginning readings by connecting the distributor 1 which ordinarily sends signals over the line, directly to the conductors normally controlled by the receiving relay 10. This may conveniently be done by connections of the kind indicated in dotted lines at 60, 61, and 62. At the same time the circuit of the tongue of relay 10 should be opened as by a switch 63, so that it will not short circuit one of the batteries by resting on one of its contacts. When the switches are thrown to connect the distributor in this way, the sending distributor takes the place of the receiving relay in energizing relay 11. If the apparatus is properly connected and balanced, the galvanometer readings represent zero distortion when the circuits are so connected.

To compensate for the lag introduced by the transmission line, the distributor 1 may be angularly adjusted on its shaft with respect to distributor 20.

During the testing the adjustable clip 52 and 53, will be connected to include any desired portion of the segments corresponding to the total signal transmitted and may be shifted about as desired.

It is obvious that many modifications of the arrangement here shown may be made without departing from the spirit of the invention and the particular circuit arrangement here shown is to be regarded simply as illustrative.

What I claim is:

1. A system for measuring the distortion of transmitted impulses comprising means for producing a current impulse corresponding to the undistorted impulse to be transmitted, means for producing a current impulse corresponding to the distorted received impulse and means under the combined control of said two current impulses for indicating the distortion represented by the difference between the transmitted and received impulse.

2. A system for measuring the distortion of transmitted impulses comprising a relay for reproducing accurately the undistorted transmitted impulse, a second relay for reproducing accurately the distorted received impulse, and means under the combined control of said relays for indicating the difference in length between the impulses represented by the operation of the two relays.

3. A system for measuring the distortion of transmitted impulses comprising means for accurately reproducing the transmitted impulse, means for accurately reproducing the received impulse and a measuring instrument controlled jointly by said two reproducing means for showing the difference in length between the transmitted and received impulse.

4. A system for measuring the distortion of transmitted impulses including a Wheatstone bridge having a double set of ratio arms, relays associated with opposite points of said bridge and having their tongues connected to the junction points of one set of said arms and arranged to vibrate between contacts connected respectively to the corresponding terminals of the other set of said arms, a measuring instrument connected across the bridge in one direction and a source of current across the bridge in the other direction, and means for operating the tongues of said relays, one in accordance with the undistorted transmitted signal and the other in accordance with the distorted received signal.

5. A system for measuring the distortion of transmitted impulses including a Wheatstone bridge having a double set of ratio arms, relays associated with opposite points of said bridge and having their tongues connected to the junction points of one set of said arms and arranged to vibrate between contacts connected respectively to the corresponding terminals of the other set of said arms, a measuring instrument connected across the bridge in one direction, a source of current connected across the bridge in the other direction, means for operating the tongues of said relays, one in accordance with the undistorted transmitted signal and the other in accordance with the distorted received signal, and means for closing the circuit of said current source only during a predetermined period corresponding to the signal or portion of the signal to be measured.

6. The method of measuring the distortion of transmitted impulses which consists in producing an electrical impulse corresponding to the transmitted impulse, producing a second current impulse corresponding to the received signal impulse and measuring the difference between the two current impulses so produced.

7. The method of measuring the distortion of transmitted impulses which consists in producing a current impulse corresponding to the transmitted impulse, producing a second current impulse corresponding to the received impulse, and electrically combining the effects of said impulses to produce an effect representing the difference between the two produced impulses.

8. In combination, a pair of signaling paths for the transmission and reception of signaling impulses, a relay connected in each of said paths for reproducing accurately the signals transmitted and received over said paths, a series of resistances associated with said relays forming a Wheatstone bridge, an indicating instrument connected with said resistances, and circuit connections controlled by said relays for causing the operation of said indicating instrument to indicate the distortion represented by the difference between the signals in said signaling paths.

9. In combination, a pair of signaling paths for the transmission and reception of signaling impulses, a relay connected in each of said paths for reproducing accurately the signals transmitted and received over said paths, a resistance element connected with the armature of each of said relays, additional resistance elements controlled by said relays, an indicating instrument connected between points on said resistance elements, and circuit connections under the control of said relays for rendering said indicating instrument effective to indicate the difference in length between the impulses represented by the operation of the two relays.

In testimony whereof, I have signed my name to this specification this 21st day of January, 1920.

HARRY NYQUIST.

Certificate of Correction.

It is hereby certified that the State of incorporation of the assignee in Letters Patent No. 1,435,328, granted November 14, 1922, upon the application of Harry Nyquist, of Woodridge, New Jersey, for an improvement in "Distortion-Measuring Apparatus," was erroneously given as "New Jersey," whereas said State should have been given as *New York*, as shown by the records of assignments in this office; and that the said Letters Patent should be read with this correction therein that the same may conform to the record of the case in the Patent Office.

Signed and sealed this 27th day of February, A. D., 1923.

[SEAL.]
KARL FENNING,
*Acting Commissioner of Patents.*